Dec. 20, 1966  A. M. SENKEWICH ETAL  3,293,425
LIGHTED LIPSTICK
Filed April 15, 1964  2 Sheets-Sheet 1
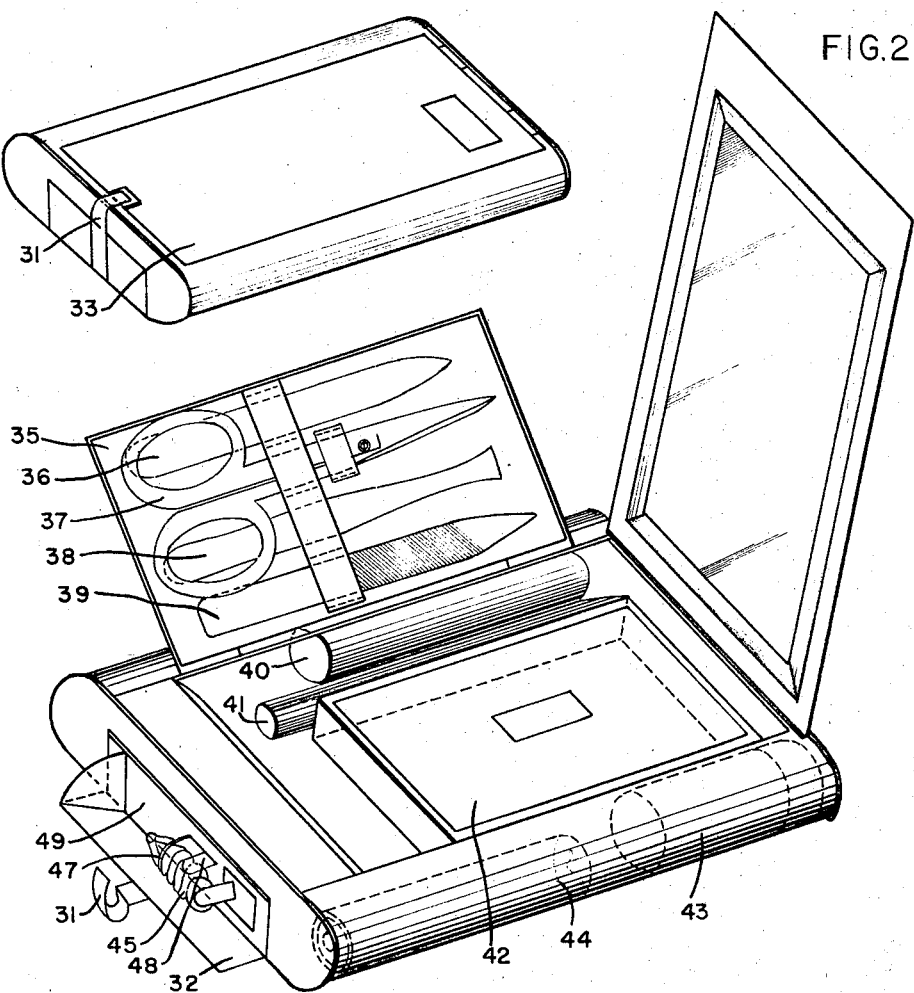
INVENTORS.
Alexander M. Senkewich
Ludmilla Senkewich

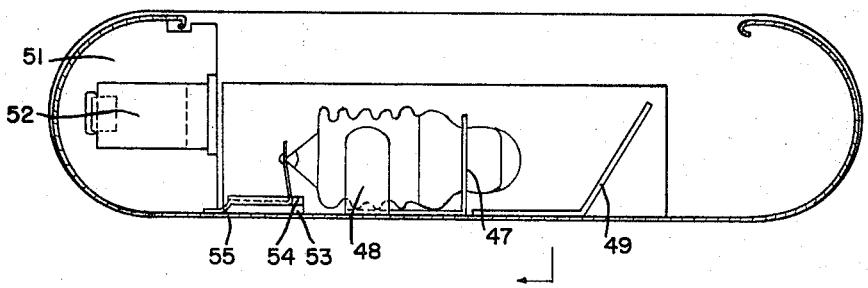

United States Patent Office 3,293,425
Patented Dec. 20, 1966

3,293,425
LIGHTED LIPSTICK
Ludmilla Senkewich and Alexander M. Senkewich, New York, N.Y., assignors of five percent to James M. Heilman, Rye, N.Y., and five percent to Marjorie Kingston, Flushing, N.Y.
Filed Apr. 15, 1964, Ser. No. 359,975
5 Claims. (Cl. 240—6.45)

The present invention aims for two targets:

(1) To provide within a small container the maximum number of small devices indispensable to each woman taking great care of her appearance.

(2) By providing a miniature electric source of light to make possible for the woman to take proper care of her appearance even in dark places or poorly lit corners.

FIG. 1 shows the external appearance of such as a closed container and seen in perspective.

FIG. 2 shows same container in the open state in perspective.

FIG. 3 presents—on an enlarged scale—a longitudinal view of the empty container.

FIG. 4 shows—also on a larger scale—the top view of the container. Dotted lines show the position of the electric bulb.

FIG. 5 cross-section along the line 1—1, also on an enlarged scale.

FIG. 6 front view of the upper insulating platelet of the positive terminal of the electric cell.

FIG. 7 top view of the same.

FIG. 8 front view of the lower insulating platelet of the terminal of the electric cell.

FIG. 9 top view of the same.

FIG. 10 front view of the positive contact with the electric cell.

FIG. 11 top view of the same.

FIG. 12 front view of the upper insulating platelet with the positive contact of the electric cell.

FIG. 13 side view of the same.

FIG. 14 front view of the holder of the electric bulb, which also forms the negative contact.

FIG. 15 side view of the same.

FIG. 16 top view of the same.

FIG. 17 front view of the positive contact of the electric bulb.

FIG. 18 side view of the same.

FIG. 19 front view of the upper insulating platelet of the positive contact at the electric bulb.

FIG. 20 top view of the same.

FIG. 21 front view of the lower insulating platelet of the positive contact at the electric bulb.

FIG. 22 top view of the same.

The container of the device is shown in FIG. 1 in the open state. By shifting the sliding door 31, we open the chamber of the electric bulb 32, and by raising the lid 33, we expose its lower surface which carries the little mirror 34. Raising the lid 35, we find on its inner side a set of devices for manicure: nail-cleaner 36, scissors 37, tweezers 38, nail-file 39.

Inside the container we find: a lipstick 40, eye-lash pencil 41, powder case 42, vial of perfume 43.

The electric bulb 45, is placed in the chamber 32, which is turnable around the axis 46 (seen in FIG. 5). This bulb is held in place by a holder (shown in FIGS. 14, 15, 16). This holder serves two purposes: the front part has a round hole through which the electric bulb enters, the glass part first. The opposite (rear) side of the holder carries two metallic grips 48, which grasp the metallic part of the electric bulb. These grips serve also for the electric contact with the positive electrode of the electric cell, which latter stands in an intimate friction contact with the container, while the bulb-holder is brazed or soldered to the body of the container.

To obtain a maximum efficiency in illuminating the face, there is provided a strip of white glossy paper 49, which deflects the beam of light in the necessary direction.

To obtain a proper connection with the negative pole of the electric cell with the electric bulb, the contacts at the electric cell and at the electric bulb must be securely insulated from the body of the container. This is achieved in the following manner:

An insulating platelet 50 (shown in FIGS. 4, 8, 9) is glued onto the inner surface of the body of the container and a second insulating platelet 51, to which is glued contact 52 (shown in FIGS. 3, 4) is attached to platelet 50. To fix the contact 52 to the platelet 51, the two ends of the contact pass through the platelet 51, and are there bent over (on the other side of 51) as shown in FIGS. 12 and 13. The bending takes place along the lines 2—2 and 3—3 of FIG. 10.

The negative contact to the electric bulb is fixed as follows: an insulating platelet 53 (in FIGS. 4, 21, 22) is glued on to the bottom of the rotatable part of the container. A second insulating platelet 54 (in FIGS. 4, 19, 20) is glued onto the platelet 53. A part of the contact 55 (in FIGS. 17, 18) is attached to the lower surface of the platelet 54.

A dotted line in FIG. 4 shows the position of the turnable part of the container at the point at which the two negative contacts touch one another and the electric bulb begins to function. This calls for the turning of the movable part of the container around the axis 46 90 degrees.

We claim:

1. A compact comprising a substantially rectangular case having a closure hinged to the face adjacent one end thereof and extending short of the opposite end of said face, a mirror attached to the inside of said closure, a cover hinged on the opposite end of said case, a latch attached to said cover, said latch when the compact is not being used extending from said cover to engage and keep both the cover and the closure in closed position, a light bulb secured to said cover whereby when said cover is opened, said light bulb will be outside the confines of the case so that the end of said case will operate as a shield and direct the light rays away from said mirror and toward the face of the user.

2. A compact as set forth in claim 1 in which an inner closure is pivoted to one edge of said case whereby to hold other beauty care instruments, and to provide a secondary door to prevent leakage of loose powder.

3. A claim as set forth in claim 2 wherein said inner closure has two transverse retaining bands thereon, and said case has two semi-circular edges to hold compactly and securely hold various rounded beauty sticks.

4. A compact comprising a substantially rectangular case having semi-circular sides, an outer closure hinged to the face portion adjacent one end of said case, a mirror on said closure, a cover hinged on the opposite end and adjacent the rear portion of said case, a clip on said swinging side of said cover and extending over and providing a latch for said closure to retain it in an inoperable position, an inner closure hinged to one of said semi-circular sides, a retaining band extending transversely across the inner side of said inner closure, a second smaller retaining band adjacent said first retaining band, both bands adapted to hold beauty care instruments, a light including a power source arranged in said case so that when said end cover is opened light rays are directed toward the face of the user and away from the mirror, and the inner portion of said case having a box to hold loose powder while other make-up material is positioned within the semi-circular sides of the case.

5. A compact comprising a substantially rectangular case having semi-circular sides, an outer closure having a mirror inner surface hinged to the face portion adjacent one end of said case, a cover hinged on the opposite end and adjacent the rear portion of said case, a clip on said swinging side of said cover and extending over and providing a latch for said closure to retain it in an inoperable position, an inner closure hinged to one of said semi-circular sides, a retaining band extending transversely across the inner side of said inner closure, a second smaller retaining band adjacent said first retaining band, both bands adapted to hold manicuring instruments, a battery positioned within one of the semi-circular sides, a light bulb in said end cover and connected to said battery so that when said end cover is opened, the bulb will light and the rays will be directed by the end of the case toward the face of the user and away from the mirror, and a powder box in the interior of said case to hold loose powder while other make-up material in the form of round sticks is positioned within the confines of the semi-circular sides of the case.

References Cited by the Examiner
UNITED STATES PATENTS

| | | | |
|---|---|---|---|
| 1,437,023 | 11/1922 | Schneider | 240—6.45 |
| 1,651,898 | 12/1927 | Maillard | 240—4.1 X |
| 2,296,112 | 9/1942 | Menn | 240—6.45 |
| 2,572,095 | 10/1951 | Baillie | 240—6.45 |

NORTON ANSHER, *Primary Examiner.*

CHARLES R. RHODES, *Assistant Examiner.*